United States Patent [19]

Jameson

[11] Patent Number: 4,468,166
[45] Date of Patent: Aug. 28, 1984

[54] APPARATUS FOR EXTENDING AND RETRACTING TELESCOPING BOOMS AND PIPELINES

[75] Inventor: Neal E. Jameson, Orange, Calif.

[73] Assignee: FMC Corporation, Chicago, Ill.

[21] Appl. No.: 396,511

[22] Filed: Jul. 8, 1982

[51] Int. Cl.³ .............................................. B67D 5/365
[52] U.S. Cl. .................................... 414/690; 414/718; 414/745; 141/231; 141/387; 212/267
[58] Field of Search ............... 212/230, 231, 264, 267; 414/718, 745, 690; 141/385, 387, 231–233, 279

[56] References Cited

U.S. PATENT DOCUMENTS 3,638,806 2/1972 Hippach .............................. 212/231
3,942,554 3/1976 Werner et al. ................... 414/718 X
4,130,134 12/1978 Castle ............................... 141/387 X Primary Examiner—Robert J. Spar
Assistant Examiner—Terrance L. Siemens
Attorney, Agent, or Firm—Lloyd B. Guernsey; Richard B. Megley

[57] ABSTRACT

A telescoping boom assembly having novel and inexpensive apparatus for extending and retracting the boom assembly and for extending and retracting an articulated pipeline mounted on the boom assembly. A total of three winches can be used to move a multiple section boom assembly between a retracted position and an extended position regardless of the number of movable boom sections, and the same three winches can independently move the articulated pipeline between a folded and an extended position.

4 Claims, 4 Drawing Figures

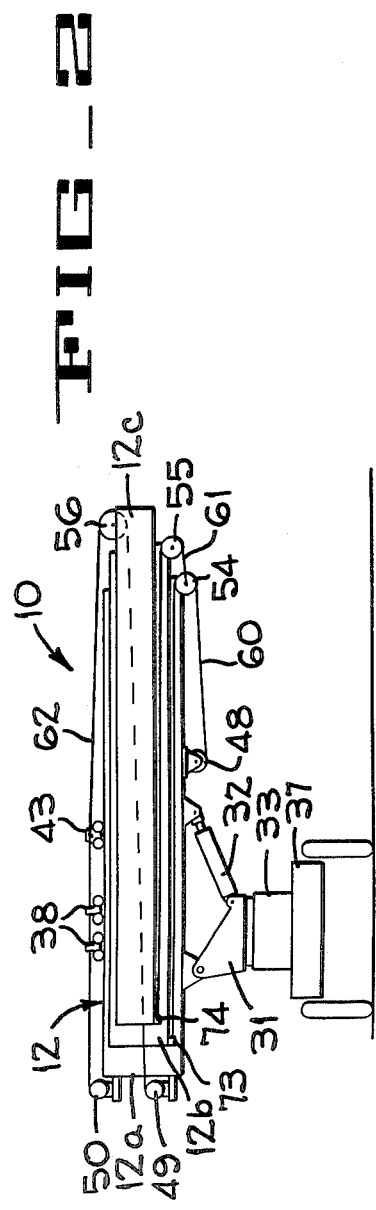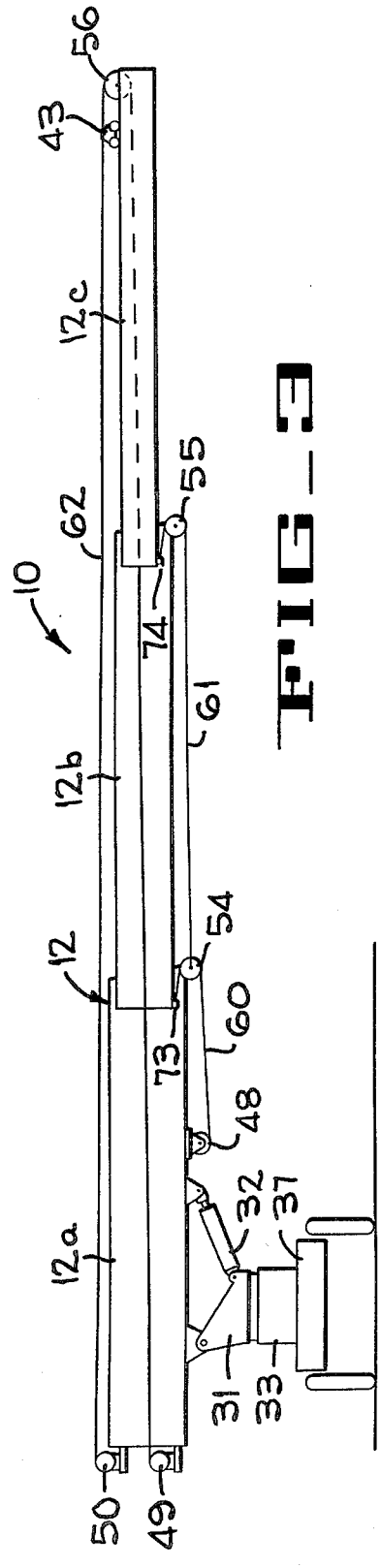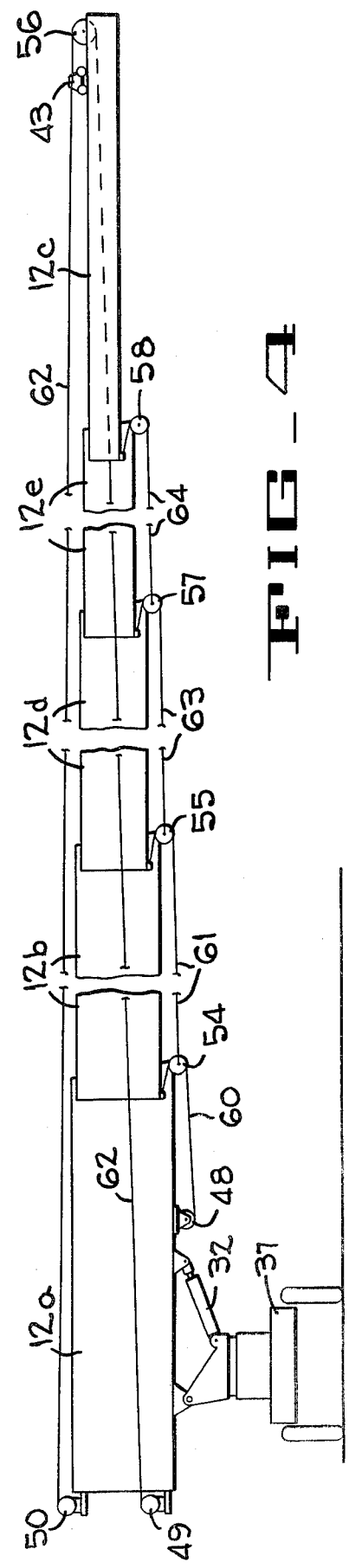

APPARATUS FOR EXTENDING AND RETRACTING TELESCOPING BOOMS AND PIPELINES

BACKGROUND OF THE INVENTION

1. Field of the Invention

This invention relates to articulated pipelines and more particularly to a telescoping boom for supporting an articulated pipeline.

2. Description of the Prior Art

During the course of producing fluids from a petroleum well it is often desirable or necessary to subject the well to a treatment procedure in order to stimulate its fluid production. This procedure usually involves the injection of fluid under high pressure, such as 20,000 psi, to fracture the producing earth formation, or the injection of an acid solution to dissolve or otherwise remove flow obstructing material, thereby increasing the flow of petroleum from the formation into the well.

In order to carry out these well stimulating procedures, it is commonplace to employ an articulated pipe assembly, called a service line, to conduct the fluid from a pumping system to a wellhead. Such service lines usually comprise a plurality of straight links of rigid pipe interconnected end-to-end by pipe swivel joints, and the entire service line is supported by an extendable boom having one end thereof pivotally connected to the service vehicle.

The articulated service pipeline is mounted on and supported at all times by a mobile telescoping boom assembly that can be extended from its transport base to carry the service line to a wellhead for connection thereto and for retracting the service pipeline for transportation from one location to another. One end of the telescoping boom is pivotally connected to a mobile transport vehicle and the other portion of the boom is raised and lowered by one or more hydraulic jacks which are connected between the transport vehicle and a portion of the telescoping boom. Such telescoping boom assemblies comprise a fixed inboard section connected to the transport base and one or more movable sections slidably mounted to retract into and extend from the fixed section. One or more hydraulic rams mounted inside the fixed section provide power to extend and retract the movable section or sections. These hydraulic rams are relatively long, heavy and require a considerable quantity of hydraulic fluid for their operation. When the rams are retracted the hydraulic fluid must be stored in a reservoir having a relatively large capacity. The large quantity of fluid adds considerable weight to the service vehicle and service of the ram inside the boom is difficult and expensive when leaks occur in the ram or in hydraulic hoses carrying fluid to the rams.

SUMMARY OF THE INVENTION

The present invention overcomes the foregoing disadvantages by providing apparatus for extending and retracting a telescoping boom assembly and an articulated pipeline, mounted on the boom assembly, using a total of three winches. The three winches can be used to move a multiple boom assembly between a retracted position and an extended position regardless of the number of movable sections in the boom assembly. The same three winches can independently move the articulated pipeline between a folded and an extended position, and can independently return the pipeline and the boom assembly to the folded position. A plurality of cables and a plurality of sheaves, each equal to the number of sections in the boom assembly cooperate with the three winches to independently operate the movable sections and the articulated pipeline.

BRIEF DESCRIPTION OF THE DRAWINGS

FIG. 2 is a side elevation showing the boom assembly of the present invention in the retracted position and with the pipeline removed.

FIG. 3 is a side elevation of the boom assembly of FIG. 2 with the boom assembly in a fully extended position.

FIG. 4 is a side elevation of another embodiment of the present invention and including additional movable sections of the boom assembly to provide additional boom length.

DESCRIPTION OF THE PREFERRED EMBODIMENT

Figure 1:
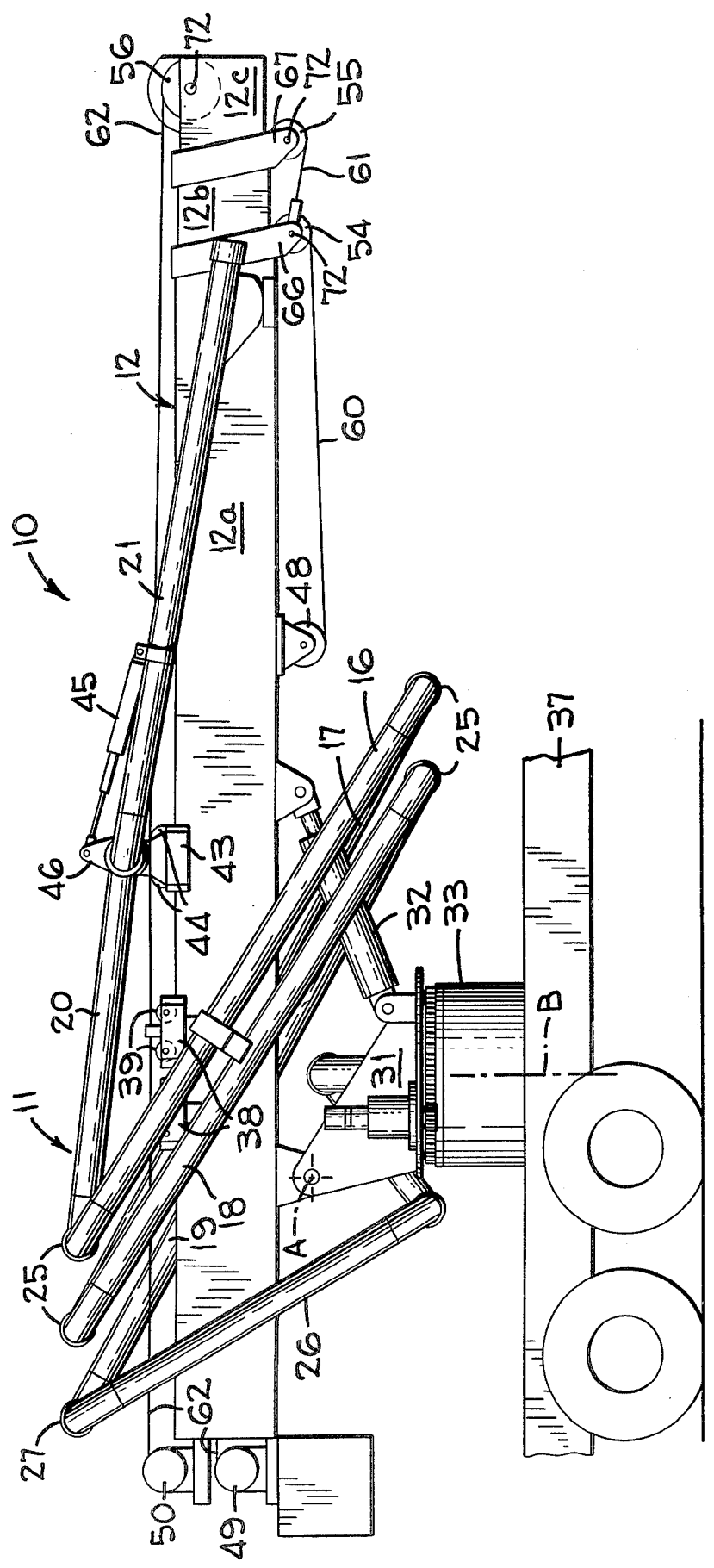
FIG. 1 is a side elevation of an embodiment of the present invention showing the pipeline and the boom assembly in folded positions.

As shown in FIGS. 1–3, apparatus for extending and retracting telescoping booms and pipelines 10 according to the present invention comprises an articulated pipeline assembly 11 mounted on a telescoping boom assembly 12. The pipeline assembly includes a plurality of clustered pipe sections 16–21 interconnected by a plurality of pipe swivel joints 25. An input pipe 26 is connected to the pipe section 19 by a swivel joint 27. The outer end of the pipe section 21 can be connected to a wellhead (not shown).

The telescoping boom assembly 12 (FIGS. 1–3) comprises three boom sections 12a, 12b and 12c. The inner section 12a which is not extendable, is pivotally mounted on a turret 31 for rotation in a vertical plane about a horizontal axis A by an elevating cylinder 32. The turret 31 is mounted on a cylindrical base 33 for rotation about a vertical axis B and the entire apparatus is suitably mounted on a trailer frame 37 or other suitable mobile transport vehicle for moving the apparatus to the job sites.

The pipeline sections 16, 18 (FIG. 1) are each connected to the boom assembly 12 by a corresponding pipe-line trolley 38 having a pair of rollers 39 mounted for movement along the length of the boom assembly. The outer end of the pipe 20 is supported by another trolley 43 (FIGS. 1–3) supported by a pair of rollers 44. A hydraulic cylinder 45 connected between the pipe section 21 and an ear 46 on the outer end of the pipe section 20 controls the elevation of the outer pipe section 21.

A plurality of winches 48–50 (FIGS. 1–3), a plurality of sheaves 54–56 and a plurality of cables 60–62 provide means for moving the boom assembly from the retracted position shown in FIG. 2 to the extended position shown in FIG. 3 and to return it to the retracted position when desired. The cable 62 and winches 49, 50 also provide means for moving the articulated pipeline 11 from the folded position shown in FIG. 1 to a fully extended position along the length of the telescoping boom 12. The sheaves 54–56 are rotatably mounted on the outer end of the boom sections 12a–12c by a pair of brackets 66, 67 and by a plurality of pins 72. The cable 60 extends from the winch 48 over the sheave 54 to an inner end 73 of the section 12b of the boom assembly 12.

The cable 61 extends from the bracket 66 over the sheave 55 to an inner end 74 of the movable boom section 12c. When the winch 48 is energized the cable 60 pulls the movable boom section 12b from the retracted position shown in FIG. 2 to the extended position shown in FIG. 3. The outward movement of the section 12b also causes the cable 61 to pull the outer section 12c of the boom assembly from the retracted position shown in FIG. 2 to the extended position shown in FIG. 3. The winches 48–50 each include a pressure release brake (not shown) which prevents rotational movement of the winches when they are not energized.

The cable 62 extends from the winch 49 over the sheave 56 to the winch 50. When the winch 49 is actuated and the winch 50 is free wheeling the trolley 43 is moved from the position shown in FIG. 2 to the position shown in FIG. 3 and the pipeline assembly 11 is moved from the folded position shown in FIG. 1 to an extended position where the outer end of the pipe 22 extends over the outer end of the boom assembly 12. When the winch 50 is actuated and the winch 49 is free wheeling the trolley 43 and the pipeline 11 moves from the extended position back to the folded position shown in FIG. 1. When the winch 50 is locked, the winch 48 is free wheeling and the winch 49 is actuated, the boom sections 12c and 12b are retracted back into the fixed boom section 12a by the winch 49, thereby moving the boom from the extended position shown in FIG. 3 to the retracted position shown in FIG. 2.

Operation of the telescoping boom supported pipeline according to the present invention can be effected as follows. After transportation to the job site, the trailer mounted apparatus is positioned at a safe, convenient location with respect to the wellhead, the telescoping boom assembly is aligned with the wellhead, as by rotating the turret 31 and/or elevating or lowering the boom 12 by the means of the elevating cylinder 32. The boom is then extended by placing the winch 50 in a locked position and allowing the winch 49 to be in a free wheeling position. The winch 48 is then actuated causing the movable boom sections 12b and 12c to move from the retracted position shown in FIG. 2 to the extended position shown in FIG. 3. Since the winch 49 is free wheeling the lower portion of cable 62 is free to extend outwardly as the boom 12 is extended. The pipeline is then moved into the extended position by locking the winch 48, placing the winch 50 in a free wheeling position and actuating the winch 49 causing the cable 62 to move the trolley outwardly along the boom assembly 12. Since the winch 48 is in a locked position the boom 12 remains in the extended position as the pipeline assembly 11 is extended or retracted. Following treatment of the well the winch 48 is locked, the winch 49 is placed in a free wheeling position and winch 50 is actuated to move the trolley 43 and the pipeline 11 from the extended position to the foled position shown in FIG. 1. The boom is then retracted by locking the winch 50, placing the winch 48 in a free wheeling position and actuating the winch 49 causing the movable boom section 12c and 12b to be moved by winch 49 from the extended position shown in FIG. 3 to the retracted position shown in FIG. 2.

If additional boom length is needed additional sections can be included in the boom assembly 12, and extension and retraction of the boom assembly and pipeline assembly 11 can still be controlled by only three winches. FIG. 4 discloses a total of four movable boom sections 12b–12e each having a sheave 54–58 and a cable 60, 61, 63, 64 for moving the corresponding sections 12b–12e outwardly when the winch 48 is actuated. The number of boom sections which can be included is limited by the cross-sectional size of the inner boom section 12a and by the boom length which can be conveniently manipulated by the elevating cylinder 32 (FIG. 1) without tipping the trailer frame 37. The winches 49, 50 (FIG. 4), move the trolley 43 along the boom assembly and also serve to retract the movable sections 12b–12e into the fixed section 12a as described hereinbefore.

Although the best mode contemplated for carrying out the present invention has been herein shown and described, it will be apparent that modification and variation may be made without departing from what is regarded to be the subject matter of the invention.

What is claimed is:

1. Apparatus for extending and retracting a telescoping boom assembly and an articulated pipeline mounted on said boom assembly, said boom assembly including a fixed inboard section and first and second movable sections, said first movable section being extendably connected to said inboard section, said second movable section being extendably connected to said first movable section, said apparatus comprising:

first, second and third winches each mounted on said inboard boom section;

first, second and third sheaves;

first, second and third cables;

means for rotatably mounting said first sheave on an outer portion of said inboard boom section;

means for connecting said first cable between said first winch and an inboard portion of said first movable section, said first cable being trained about said first sheave;

means for rotatably mounting said third sheave on an outer portion of said first movable section;

means for connecting said third cable between said inboard section and an inboard portion of said second movable section, said third cable being trained about said third sheave;

means for rotatably mounting said second sheave on an outer portion of said second movable section;

means for connecting said second cable between said second and said third winches, said second cable being trained about said second sheave;

a trolley movably mounted on said boom assembly and connected to an outboard portion of said articulated pipeline to support a portion of said pipeline; and means for connecting said trolley to said second cable wherein actuation of said second winch causes said trolley to move outwardly along said boom assembly when said third winch is free wheeling and actuation of said second winch causes said first and said second movable sections to retract when said third winch is in a locked position.

2. Apparatus for extending and retracting a boom assembly and a pipeline as defined in claim 1 wherein an inboard portion of said articulated pipeline is mounted on said fixed section, and wherein said first, second and third winches selectively extend and retract said movable sections and selectively move said trolley outwardly and inwardly along said boom assembly.

3. Apparatus for extending and retracting a boom assembly and a pipeline as defined in claim 1 wherein actuation of said first winch causes said first and said second movable sections to extend outwardly from said fixed section, actuation of said second winch causes said trolley and said outboard portion of said pipeline to move outwardly along said boom assembly, actuation of said third winche causes said trolley and said outboard portion of said pipeline to move inwardly along said boom assembly, and actuation of said second winch with said third winch in a locked position causes said first and said second movable sections to retract into said fixed section.

4. Apparatus for extending and retracting as defined in claim 1 wherein actuation of said first winch causes said first cable to extend said first movable section and said extension of said first movable section causes said third cable to extend said second movable section.

* * * * *